(12) United States Patent
Strohheker

(10) Patent No.: US 8,240,940 B2
(45) Date of Patent: Aug. 14, 2012

(54) GLASS-PANE SPACER CORNER CONNECTOR

(75) Inventor: Rolf Strohheker, Pforzheim-Huchenfeld (DE)

(73) Assignee: S & T Components GmbH & Co. KG, Remchingen-Noettingen (DE)

( * ) Notice: Subject to any disclaimer, the term of this patent is extended or adjusted under 35 U.S.C. 154(b) by 212 days.

(21) Appl. No.: 12/249,240

(22) Filed: Oct. 10, 2008

(65) Prior Publication Data

US 2009/0129857 A1     May 21, 2009

Related U.S. Application Data

(63) Continuation of application No. PCT/EP2007/003020, filed on Apr. 4, 2007.

(30) Foreign Application Priority Data

Apr. 13, 2006  (DE) .......................... 10 2006 017 821

(51) Int. Cl.
*F16B 1/00* (2006.01)
*F16B 9/00* (2006.01)
*F16L 41/00* (2006.01)

(52) U.S. Cl. ....................................... 403/205; 52/656.9

(58) Field of Classification Search .................. 403/169, 403/170, 174, 205, 217, 401, 402; 49/501; 52/656.9, 786.13

See application file for complete search history.

(56) References Cited

U.S. PATENT DOCUMENTS

| | | | | | |
|---|---|---|---|---|---|
| 2,281,220 | A | * | 4/1942 | Anderson | 403/205 |
| 4,636,105 | A | * | 1/1987 | Johansson | 403/205 |
| 4,702,638 | A | * | 10/1987 | Zalesak | 403/403 |
| 5,076,736 | A | * | 12/1991 | Grewe et al. | 403/295 |
| 5,820,292 | A | * | 10/1998 | Fremstad | 403/403 |
| 6,171,013 | B1 | * | 1/2001 | Lee | 403/231 |
| 6,527,278 | B1 | * | 3/2003 | Norris | 277/630 |
| 6,989,188 | B2 | * | 1/2006 | Brunnhofer et al. | 428/188 |

FOREIGN PATENT DOCUMENTS

| | | | |
|---|---|---|---|
| CN | 2011462 | * | 12/2007 |
| DE | 31 17 615 A1 | | 11/1982 |
| DE | 20 2004 017 398 U1 | | 4/2006 |
| FR | 2 291 339 | | 6/1976 |
| GB | 2321924 A | * | 8/1998 |
| WO | WO 00/05475 | | 2/2000 |

\* cited by examiner

*Primary Examiner* — Daniel P. Stodola
*Assistant Examiner* — Nahid Amiri
(74) *Attorney, Agent, or Firm* — Harness, Dickey & Pierce, P.L.C.

(57) ABSTRACT

A corner connector for glass pane spacers includes a first and a second connecting element, on each of which a spacer can be mounted, and a corner element, which joins the two connecting elements at an angle, wherein the corner element has two lateral surfaces facing the glass panes, two end surfaces facing the respective spacer and an outer surface. The corner connector is characterized in that a metal foil is applied to the outer surface and at least partially to the lateral surfaces and the end surfaces, and butyl is provided in the area of the end surfaces, which creates a seal between the metal foil and the inserted spacer.

10 Claims, 2 Drawing Sheets

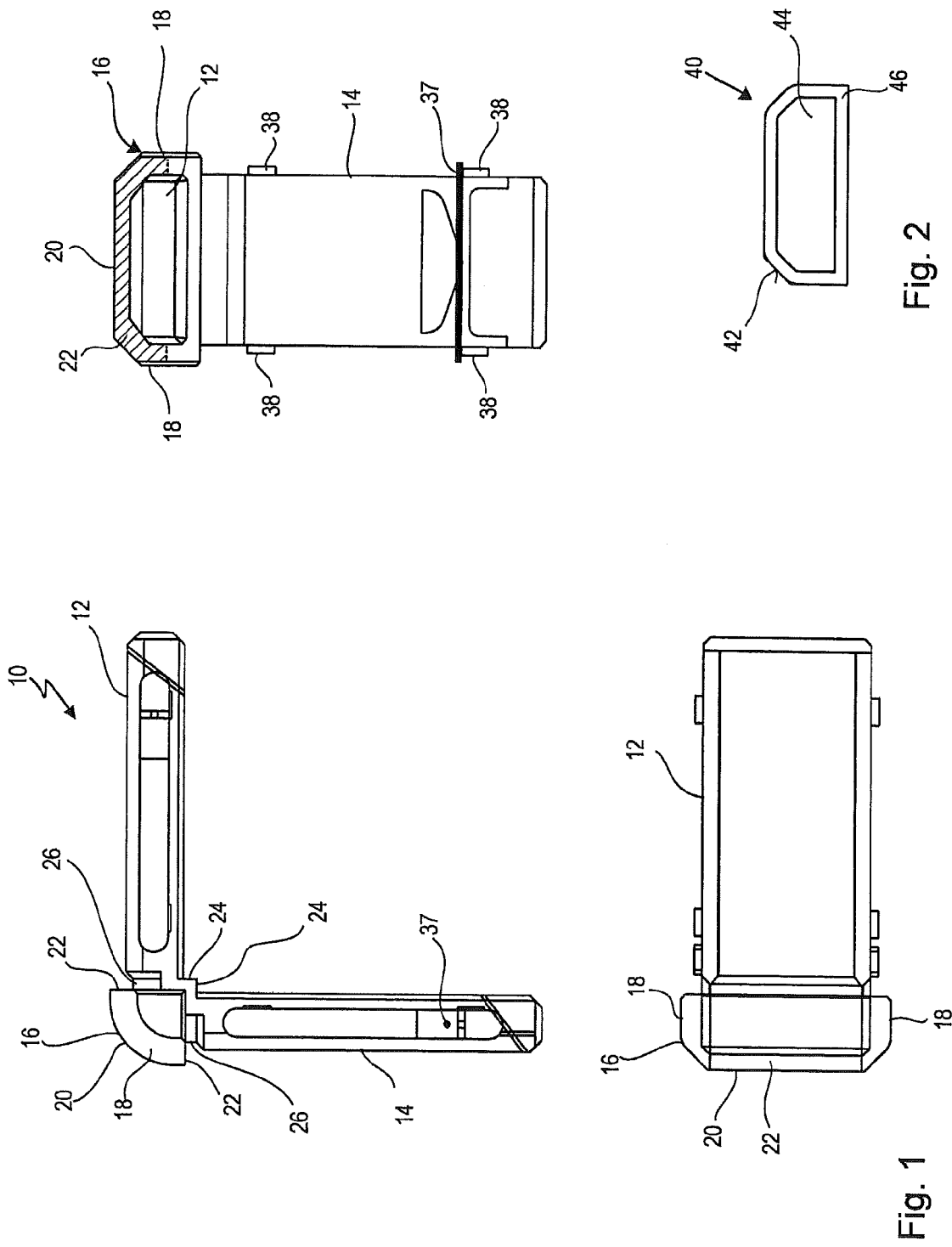

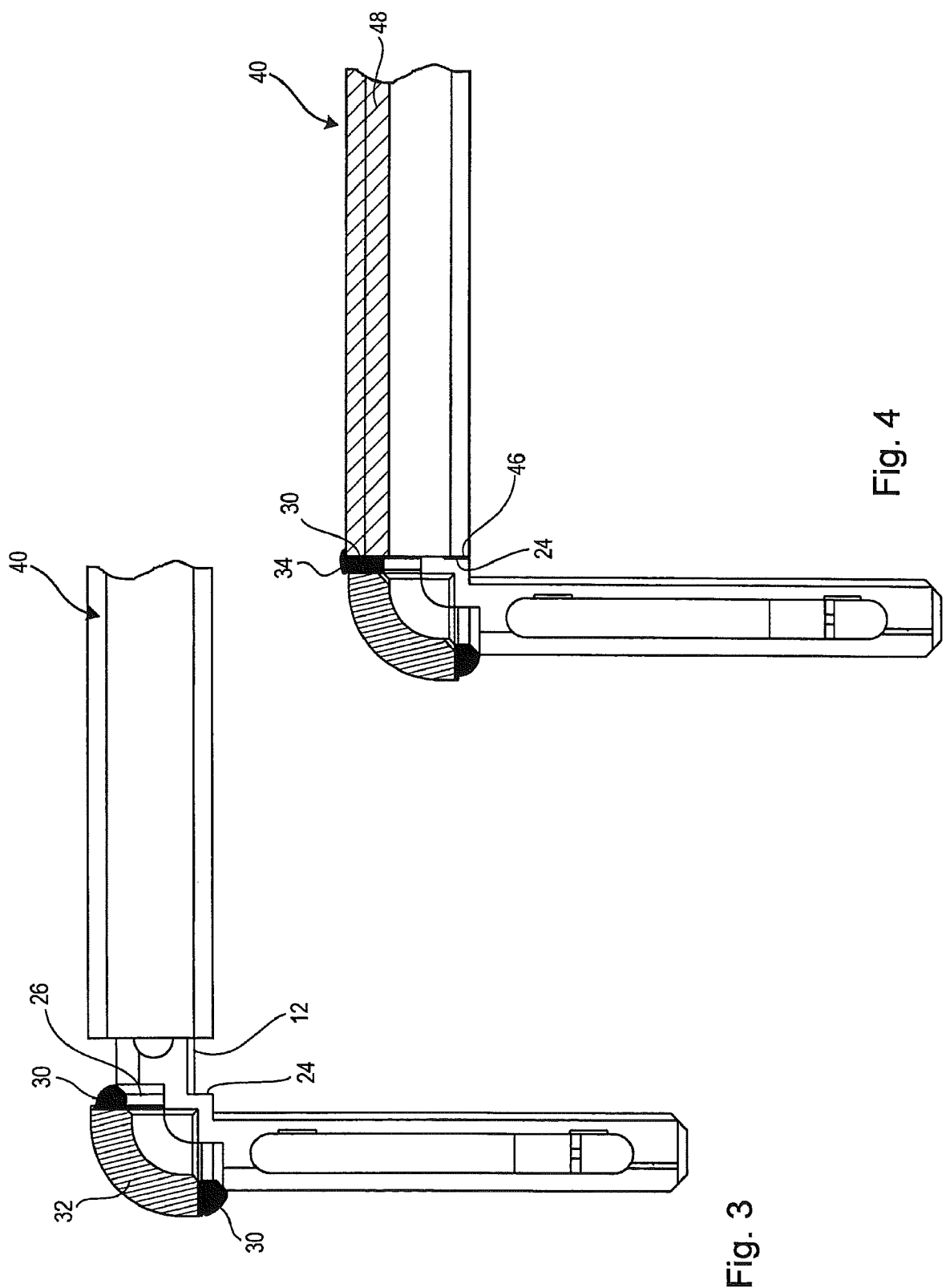

GLASS-PANE SPACER CORNER CONNECTOR

CROSS-REFERENCES TO RELATED APPLICATIONS

This application is a continuation of copending international patent application PCT/EP2007/003020 filed on Apr. 4, 2007 and designating the U.S. and published in the German language, which claims priority of German patent application DE 10 2006 017 821.1 filed on Apr. 13, 2006.

BACKGROUND OF THE INVENTION

The present invention relates to a corner connector for glass pane spacers comprising a first and a second connecting element, on each of which a spacer can be mounted, and a corner element, which joins the two connecting elements at an angle, wherein the corner element has two lateral surfaces facing the glass panes, two end surfaces facing the respective spacer and an outer surface.

Such corner connectors are generally known. For example, a corner connector on which spacers can be mounted is shown in the document DE 31 17 615 A1.

In principle, such spacers are used for keeping two glass panes, in particular insulating glass panes, at a distance and sealing the space produced between the panes from the outside. That is to say, a main function of the spacers is to create an air-impermeable, in particular water-vapor-impermeable, seal. This sealing function must also be maintained even under great temperature fluctuations. If the sealing effect is lost, moisture can get into the interior space between the insulating glass panes, which leads to fogging of the pane.

Apart from the solution with corner connectors that is shown in the aforementioned document, the 90° angles of the spacers are very often also achieved by the spacers being bent over. However, this may cause loss of integrity of the seal, which may later likewise lead to fogging of the pane.

The previously available solutions either have the disadvantage that sealing problems may occur or that they are laborious to work with—as in the aforementioned prior art.

SUMMARY OF THE INVENTION

Against this background, one of the objects of the present invention is to provide a corner connector which on the one hand is easy to work with and on the other hand achieves the required sealing effect.

This object is achieved in the case of the corner connector of the type mentioned at the beginning by a metal foil being applied to the outer surface and at least partially to the lateral surfaces and the end surfaces, and by butyl being provided in the area of the end surfaces, which creates a seal between the metal foil and the inserted spacer.

The corner connector according to the invention has the advantage that the spacer must merely be inserted, the sealing by means of the butyl that is provided taking place at the same time as the insertion. In addition, the foil that is provided achieves the effect on the one hand that the corner connector is impermeable to water vapor in the area of the corner element and on the other hand that a good connection between the corner element and the butyl is achieved.

In the case of a preferred embodiment, on each inner area of the end surfaces of the corner element there is provided a stop surface for the spacer, formed in such a way that a gap between the end surface and the spacer is produced in the outer area.

This means in other words that, in the inserted state, the spacer does not lie with its full surface area against the end surface of the corner element. Rather, the spacer only lies against the stop surface in the inner area of the corner element, so that a gap between the end surface and the spacer is produced in the outer area of the corner element, a gap in which the butyl lies. The amount of butyl is in this case chosen such that, when the spacer is inserted, the butyl is forced out via the gap, and consequently achieves a reliable seal between the end surface and the spacer.

In the case of a preferred embodiment, the connecting elements and the corner element are formed in one piece. The corner connector is preferably produced from plastic.

It goes without saying that the corner connector may also be produced from other materials. However, plastic has been found to be particularly advantageous. Should the corner connector be produced from metal, for example, it is possible to dispense with a separate metal foil, since it is, as it were, already an integral part of the corner connector.

In the case of a preferred embodiment, the foil is adhesively attached to the corner element.

This measure has the advantage that application is very simple. It goes without saying that the foil may also be fastened to the corner element in some other way. The way in which it is fastened depends primarily on the thickness of the foil that is used. In the case of foil thicknesses in the μ range, adhesive bonding has been found to be advantageous. Thicker foils on the other hand could also be applied differently.

In the case of a preferred embodiment, the connecting elements each have at least one holding element, in order to hold the inserted spacer. The holding elements are preferably formed as latching elements.

That is to say in other words that, when it reaches its end position, the spacer is locked on the connecting element, so that it can no longer be separated from the corner connector.

It goes without saying that releasable connections are also conceivable.

Further advantages and refinements of the invention emerge from the description and the accompanying drawing.

It will be appreciated that the features mentioned above and those still to be explained below can be used not only in the respectively specified combination but also in other combinations or on their own without departing from the scope of the present invention.

BRIEF DESCRIPTION OF THE DRAWINGS

The invention is now explained in more detail on the basis of an embodiment with reference to the drawing, in which:

FIG. 1 shows a representation of the corner connector according to the invention from three views;

FIG. 2 shows a sectional representation of a spacer;

FIG. 3 shows a side view of the corner connector according to the invention with a partially mounted spacer; and FIG. 4 shows a side view of the corner connector according to the invention with a fully mounted spacer.

DETAILED DESCRIPTION OF PREFERRED EMBODIMENTS

In FIG. 1, a corner connector is represented in three different views and is identified generally by the reference numeral 10. The corner connector is produced in one piece from a plastics material, it going without saying that other materials can also be used. In addition, the corner connector could also be composed of a number of individual parts.

The corner connector 10 has two connecting elements 12, 14, which are joined to each other at a 90° angle by means of a corner element 16. The two connecting elements 12, 14 also lie in one plane.

The two connecting elements 12, 14 are preferably identically formed and have a cross-sectional form that is adapted to the form of the spacer, as it is shown for example in FIG. 2. In particular, the cross section of the connecting elements 12, 14 is formed in such a way that the spacer identified in FIG. 2 by the reference numeral 40 can be mounted. The connecting elements 12, 14 then respectively protrude into a hollow space 44 of the spacer 40.

The corner element 16 of the corner connector 10 has an arcuate outer surface 20, which extends from a first end surface 22 through 90° to a second end surface 22 of the corner element. In the example shown, the outer surface 20 lies perpendicular to the plane of the drawing.

The corner element 16 has two lateral surfaces 18, which extend inward from the outer surface 20. In the representation on the right in FIG. 1, it can be seen that the lateral surfaces 18 comprise two portions, the outer portion running obliquely in relation to the outer surface 20 and the inner portion running perpendicularly in relation to the outer surface 20.

Finally, the corner element 16 has two end surfaces 22, which each extend perpendicularly from the outer surface 16 inward and face the connecting elements 12 and 14, respectively.

In FIG. 1, two further stop surfaces 24 can be seen in the area of the corner element 16, lying in the inner area of the corner element and each likewise facing the connecting elements 12 and 14, respectively. That is to say in other words that the stop surfaces 24 are parallel to the respective end surface 22. However, the stop surfaces 24 are each at a distance from the end surface 22, so that, when the spacer 40 is pushed onto the respective connecting element 12, 14, an end surface 46 of the spacer first butts against the stop surface 24, so that the end surface 46 of the spacer is at a certain distance from the end surface 22. The function of this distance will be further explained later with reference to FIGS. 3 and 4.

Finally, it can also be seen in FIG. 1 that, in the area of the end surfaces 22, a groove 26 is in each case provided in the respective connecting element 12 or 14. This groove 26 extends from one side of the connecting element 12, 14 over its outer side to the opposite side. It can be seen in the plan view of the corner connector that the groove 26 extends inward in the direction of the stop surface 24 and goes almost up to the middle of the connecting element 12 (i.e. almost up to the longitudinal axis). With respect to the respective connecting element 12, 14, the groove 26 extends in the longitudinal direction almost up to the stop surface 24.

Finally, in the representation of the corner connector 16 on the right in FIG. 1 there can also be seen latching elements 38, which interact in a latching manner with the spacer 40 by means of a wire 37, the wire 37 being led around the connecting element 12, 14 and taken along when a spacer is inserted. For example, depressions in which these latching elements 38 can engage when the spacer has reached its end position may be provided in a wall 42 of the spacer 40.

Altogether, the corner element 16 is formed in such a way that it achieves an esthetic transition from one spacer 40 to the other spacer. This means that, in the area of the end surfaces 22, the outer surface 20 of the corner element 16 lies approximately in a plane with the respective outer surface of the spacer 40, so that a good transition is achieved. The same also applies, moreover, to the lateral surfaces 18 of the corner element 16, which are adapted approximately to the lateral surfaces of the spacer 40, as can be seen from the representation on the right in FIG. 1. In addition, the end surface 22 is consequently also adapted approximately to the end surface 46 of the spacer.

Now reference is made to FIGS. 3 and 4, which illustrate side views of the corner connector. In order to seal the corner connector in the area of the corner element 16, a foil of metal is adhesively attached to the lateral surface 18, the outer surface 20 and the end surface 22. In FIG. 3, this foil is represented by shading and is identified by the reference numeral 32. In the representation on the right in FIG. 1, the foil 32 is likewise represented by shading in the area of the end surface 22. The foil therefore does not extend over the entire lateral surface. However, it is quite conceivable to provide a larger or smaller area of the lateral surface 18 with the metal foil 32.

A sealing material, which in the present case is butyl, is provided in the two grooves 26. This sealing material is identified in FIG. 3 by the reference numeral 30. It lies in the groove 26 and extends up to the upper edge of the respective end surface 22.

The butyl 30 is intended to achieve a seal between the end surface 22 and the inserted spacer 40.

As revealed by FIG. 4, when it is mounted on the connecting element 12, the end surface 46 of the spacer 40 butts against the stop surface 24, the end surface 46 then still being at a distance from the end surface 22 of the corner element. The butyl 30 lying in this gap is squeezed together when the spacer 40 is inserted, and is forced outward, which is identified by the reference numeral 34. This squeezing together of the butyl 30 on the one hand has the advantage that an extremely good inward seal is achieved in the critical area between the corner element 16 and the spacer 40. On the other hand, this seal is also not lost under changing temperatures, since an adequate amount of butyl material is present. Even if the gap between the end surface 22 and the end surface 46 should become slightly larger for temperature-related reasons, the seal does not deteriorate, since the butyl 30 compensates for this.

It should finally also be pointed out that, in an outer area, the spacer 40 also has a foil of metal, which is identified in FIG. 4 by the reference numeral 48. This foil 48 likewise serves for inward sealing.

As already mentioned at the beginning, spacers 40 serve the purpose of keeping two insulating glass panes at a distance and sealing the hollow space produced in between against penetration of air or moisture. In the case of the corner connector shown in FIG. 4, the two insulating glass panes would be arranged parallel to the plane of the drawing in front of and behind the corner connector, parallel to the lateral surface 18.

What is claimed is:

1. A corner connector for use with glass pane spacers used for maintaining a space between two glass panes, comprising:
   a first connecting element defining a first axis and a second connecting element defining a second axis, on each of which a spacer having a substantially flat end surface can be mounted, and
   a corner element, which joins the first and second connecting elements at an angle defined by said first and second axes, wherein the corner element has two lateral surfaces adapted to face the glass panes, two end surfaces each arranged perpendicular to the respective axis of the adjoining first or second connecting element so as to face the substantially flat end surface of the spacer adapted to be mounted thereon, an inner area adjacent each of said two end surfaces, and an outer surface, wherein a metal foil is applied to the outer surface and at least partially to the lateral surfaces and the end surfaces, a butyl is provided in the area of the end surfaces, which creates a seal between the metal foil and the spacer adapted to be mounted thereon, and in each inner area of the corner element there is provided a stop surface that is spaced from its respective end surface in the axial direction perpendicular to said respective end surface so that a gap is created in said axial direction between said respective end surface and the substantially flat end surface of the spacer in an outer area of said corner element when the spacer is mounted on one of the first and second connecting elements and abuts said stop surface.

2. The corner connector as claimed in claim 1 wherein the butyl is provided in the gap, the amount of butyl being chosen such that, when the spacer is mounted, the butyl is squeezed to a side.

3. The corner connector as claimed in claim 2 wherein the connecting elements and the corner element are formed in one piece, from plastic.

4. The corner connector as claimed in claim 3 wherein the foil is adhesively attached.

5. The corner connector as claimed in claim 4 wherein the first and second connecting elements each have at least one holding element, in order to hold the mounted spacer.

6. The corner connector as claimed in claim 1 wherein the connecting elements and the corner element are formed in one piece, from plastic.

7. The corner connector as claimed in claim 1 wherein the foil is adhesively attached.

8. The corner connector as claimed in claim 1 wherein the first and second connecting elements each have at least one holding element, in order to hold the mounted spacer.

9. The corner connector as claimed in claim 8 wherein the holding element is formed as a latching element.

10. The corner connector as claimed in claim 9 wherein the holding element is formed as a latching element.

* * * * *